(12) United States Patent
Nishimura et al.

(10) Patent No.: US 7,659,028 B2
(45) Date of Patent: Feb. 9, 2010

(54) POLYMER ELECTROLYTE FUEL CELL

(75) Inventors: Katsunori Nishimura, Hitachiota (JP);
Masahiro Komachiya, Hitachinaka (JP); Jinichi Imahashi, Hitachi (JP);
Tohru Koyama, Hitachi (JP); Tomoichi Kamo, Tokai (JP)

(73) Assignee: Hitachi, Ltd., Tokyo (JP)

( * ) Notice: Subject to any disclaimer, the term of this patent is extended or adjusted under 35 U.S.C. 154(b) by 694 days.

(21) Appl. No.: 10/845,144

(22) Filed: May 14, 2004

(65) Prior Publication Data

US 2004/0209149 A1    Oct. 21, 2004

Related U.S. Application Data

(63) Continuation of application No. 10/078,534, filed on Feb. 21, 2002, now abandoned.

(30) Foreign Application Priority Data

Oct. 31, 2001    (JP) .............................. 2001-333605

(51) Int. Cl.
*H01M 8/10* (2006.01)
(52) U.S. Cl. .............................. 429/39; 429/35; 429/38
(58) Field of Classification Search .................. None
See application file for complete search history.

(56) References Cited

U.S. PATENT DOCUMENTS

| | | | |
|---|---|---|---|
| 5,776,624 A | 7/1998 | Neutzler | |
| 6,120,923 A | 9/2000 | Van Dine et al. | |
| 6,607,858 B2 | 8/2003 | Wozniczka et al. | |
| 7,052,797 B2 * | 5/2006 | Nakamura et al. | 429/36 |
| 7,238,981 B2 | 7/2007 | Marotta | |
| 7,239,376 B2 | 7/2007 | Hibbs et al. | |
| 2001/0051294 A1 | 12/2001 | Inoue et al. | |
| 2002/0031698 A1 | 3/2002 | Inoue et al. | |
| 2002/0045084 A1 | 4/2002 | Fujii et al. | |
| 2002/0094464 A1 | 7/2002 | Wangerow | |
| 2003/0049514 A1 | 3/2003 | Mallant | |
| 2003/0162079 A1 | 8/2003 | Ooma et al. | |
| 2004/0115512 A1 | 6/2004 | Fujii et al. | |
| 2004/0209141 A1 | 10/2004 | Yamazaki et al. | |

FOREIGN PATENT DOCUMENTS

JP    5-101837    4/1993

(Continued)

OTHER PUBLICATIONS

U.S. Office Action issued in corresponding U.S. Appl. No. 11/440,271, filed Jan. 9, 2007.

(Continued)

*Primary Examiner*—John S Maples
(74) *Attorney, Agent, or Firm*—McDermott Will & Emery LLP

(57) ABSTRACT

This invention provides an electrode for a polymer electrolyte fuel cell which fuel cell contains: a solid polymer electrolyte membrane; electrode layers formed respectively on both faces of the electrolyte membrane; two reinforcing members which cover respective outer surfaces of the electrode layers; and a sealing member which covers, extending from respective end faces to respective end parts of the reinforcing members, whole peripheries of the two reinforcing members, wherein the electrolyte membrane, the electrode layers and the reinforcing members are integrally formed by the sealing member.

9 Claims, 11 Drawing Sheets

FOREIGN PATENT DOCUMENTS

| | | |
|---|---|---|
| JP | 8-13179 | 1/1996 |
| JP | 10-154521 | 6/1998 |
| JP | 2000-90944 A | 3/2000 |
| JP | 2000-133289 | 5/2000 |
| JP | 3110760 | 9/2000 |
| JP | 2000-294254 | 10/2000 |
| JP | 2000-299119 A | 10/2000 |
| JP | 2001-15127 A | 1/2001 |
| JP | 2001-155745 A | 6/2001 |
| JP | 2001-256985 A | 9/2001 |

OTHER PUBLICATIONS

U.S. Office Action issued in U.S. Appl. No. 11/440,271, filed Jul. 16, 2007.

U.S. Office Action, issued in corresponding U.S. Appl. No. 11/440,271, filed Oct. 9, 2007.

* cited by examiner

POLYMER ELECTROLYTE FUEL CELL

This application is a continuation of application Ser. No. 10/078,534, filed on Feb. 21, 2002, now abandoned.

BACKGROUND OF THE INVENTION

This invention relates to an electrode for a polymer electrolyte fuel cell, a separator therefor, and a polymer electrolyte fuel cell and generating system using them.

BACKGROUND OF THE INVENTION

Since polymer electrolyte fuel cells have many advantages including a high output, long life, little deterioration caused by starting and stopping, low operating temperature (about 70-80° C.) and unnecessity of precise differential pressure control, polymer electrolyte fuel cells are expected to be useful for a wide range applications including a power source for electric automobiles and distributed power sources for business and domestic uses.

With regard to a solid electrolyte membrane used for producing a polymer electrolyte fuel cell, there is disclosed a technique which forms a thin film of a fluorine-containing solid polymer electrolyte on one face of a stretched porous polytetrafluoroethylene sheet to thereby impart a sealing effect and a thermal and/or mechanical reinforcing effect to the electrolyte thin film (JP-A-8-13179). With regard to the cell structure, there is known a fuel cell membrane electrode assembly in which a groove for passing a gas is cut in a gas diffusion electrode layer (JP-A-8-507402). Further, there is known a structure in which, in order to prevent dislocation between a separation and a packing at the time of stacking, the packing is fit into a concave part of the separator (JP-A-2000-294254).

SUMMARY OF THE INVENTION

Generally, a single cell of a polymer electrolyte fuel cell is constructed of a membrane electrode assembly comprising a solid polymer electrolyte membrane of several ten μm thickness, the electrolyte having protonic conductivity, provided on its both sides with a porous electrode layers carrying a catalyst of platinum or platinum-ruthenium or the like alloy, and of a separator provided with a gas passage which supplies hydrogen to one electrode (anode) and air (oxygen) to the other electrode (cathode). As occasion demands, a gas diffusion layer may be provided at the gap between the electrode layer and the separator for diffusing gas and thereby to allow the gas to react at the whole surface of the electrode layer.

Generally, a cell stack formed by stacking a plurality of such single cells according to the required output is used in the actual practical system. Since gas is passed through in the separator face, it is important how to keep the gas sealing property between separators over a long period. Further, since a large number and plural kinds of components, including solid polymer electrolyte membranes, separators, gaskets and current collecting plates are stacked, securing the positioning accuracy and automating the assembling step are serious problems. In particular, solid polymer electrolyte membranes are generally used in the form of a thin film with a thickness of 100 μm or less to suppress electric power loss due to their resistance; since such thin film is flexible and difficulty maintains its shape, its handling property is very poor, which presents an obstacle to the automation of the assembling step. Moreover, since a large number and many kinds of components are stacked, it becomes difficult to attain reduction in the cost of production facilities, increase in the yield of the product and shortening in the assembling time; therefore, it is essential for reducing the cell production cost to simplify the structure of the cell. Accordingly, a technology which can improve the handling property of solid polymer membranes is required to attain the automation of the production steps, improvement of the yield of the product and reduction of the cell production cost.

Among the components hitherto used for producing polymer electrolyte fuel cells, a solid polymer electrolyte membrane, for example, is very thin and is poor in the function of retaining its shape; therefore, in assembling a cell, it has been difficult to transfer these components to predetermined positions and stack them without causing such troubles as turning over and crimping. Furthermore, with such components which are poor in handling property, it has been impossible to transfer the component precisely to the predetermined position and it has been difficult to assemble a polymer electrolyte fuel cell.

The object of this invention is to provide an electrode for a polymer electrolyte fuel cell, a separator therefor, and a polymer electrolyte fuel cell and a generating system, which electrode is simplified in structure, have high handling property, can be transferred precisely to a predetermined position, and enables automation of a production process.

A polymer electrolyte fuel cell of this invention has a structure comprising preferably, to obtain a sufficient electric power, a plurality of single cells connected in series, the single cell being of a basic structure comprising a solid polymer electrolyte membrane having a function of permitting permeation of hydrogen ions, electrode layers formed on both faces of the membrane, and separators arranged so as to sandwich the electrode layers.

Thus, this invention provides an electrode for a polymer electrolyte fuel cell which electrode comprises: a solid polymer electrolyte membrane; electrode layers formed respectively on both faces of the electrolyte membrane; two reinforcing members which cover respective outer surfaces of the electrode layers; and a sealing member which covers, extending from respective end faces to respective end parts of the reinforcing members, at least a part or preferably whole of the periphery of the two reinforcing members, wherein the electrolyte membrane, the electrode layers and the reinforcing members are integrally formed by the sealing member.

More specifically, this invention provides an electrode for a polymer electrolyte fuel cell wherein the electrode layer has a polymer electrolyte and catalyst particles formed on a surface of carbon particles, and the reinforcing member comprises a sheet having a permeability to gases and electronic conductivity.

Further, this invention provides a polymer electrolyte fuel cell which comprises the above-mentioned electrode and an anode side separator and cathode side separator arranged on both sides of the electrode.

Further, this invention provides a separator for a polymer electrolyte fuel cell which separator comprises: at least one passage for gas and water formed on at least one face of a member comprising a flat plate; supply ports for the gas and water provided so as to communicate with the passages and to pass through the member; and exhaust ports for the gas and water provided so as to communicate with the passages and to pass through the member.

This invention further provides a polymer electrolyte fuel cell comprising the above-mentioned electrode and the above-mentioned separators sandwiching the electrode.

Further, this invention provides a generating system which comprises: a hydrogen gas-storing apparatus or a gas-producing apparatus that produces a hydrogen-containing gas from a hydrocarbon fuel; and a polymer electrolyte fuel cell; wherein the apparatus and the fuel cell are connected with piping that passes the hydrogen-containing gas or the hydrogen gas and wherein the generating system generates electricity by the action of the hydrogen-containing gas or hydrogen gas supplied from the apparatus and the polymer electrolyte fuel cell comprises the above-mentioned polymer electrolyte fuel cell.

Other objects, features and advantages of the invention will become apparent from the following description of the embodiments of the invention taken in conjunction with the accompanying drawings.

DESCRIPTION OF REFERENCE NUMERALS

Figure 1:
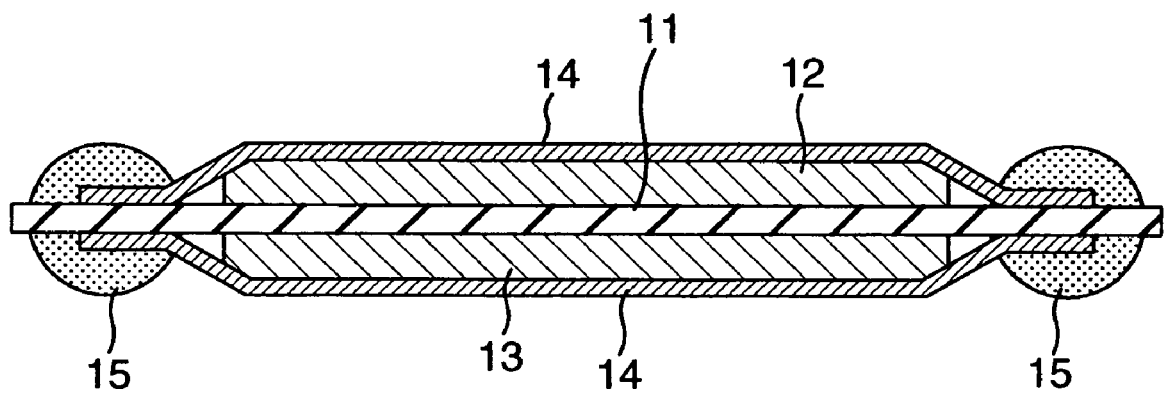
FIG. 1 is a sectional view of an integrated electrode for a polymer electrolyte fuel cell of this invention.

11 . . . solid polymer electrolyte membrane, 12 . . . anode side electrode layer, 13 . . . cathode side electrode layer, 14 . . . electroconductive porous reinforcing member, 15 . . . sealing member of integrated electrode, 21 . . . supply port for cathode gas, 22 . . . supply port for cooling water, 23 . . . supply port for anode gas, 24 . . . gas passage (grooved part), 25 . . . rib part (convex part), 26 . . . anode face of separator for single cell, 27 . . . exhaust port for anode gas, 28 . . . exhaust port for cathode gas, 29 . . . exhaust port for cooling water, 30 . . . flat plane part, 31 . . . sealing member of supply port for cathode gas, 32 . . . sealing member of supply port for cooling water, 33 . . . sealing member of supply port for anode gas, 35 . . . sealing member, 36 . . . covering component, 37 . . . sealing members of exhaust port for anode gas, 38 . . . sealing member of exhaust port for cathode gas, 39 . . . sealing member of exhaust port for cooling water, 41 . . . separator for cooling water to which sealing member is attached, 42 . . . flat part of separator for cooling water, 44 . . . rib part (convex part), 45 . . . passage for cooling water (grooved part), 46 . . . reinforcing member, 52 . . . single cell comprising separator and integrated electrode according to this invention, 53 . . . current collecting plate, 54 . . . cooling water cell, 55 . . . stacked part, 56 . . . insulating sheet, 57 . . . end plate, 58 . . . bolt, 59 . . . disc spring, 61 . . . low density part of carbon-containing sheet of this invention, 62 . . . high density part of carbon-containing sheet of this invention, 63 . . . supply port for cathode gas, 64 . . . supply port for cooling water, 65 . . . supply port for anode gas, 66 . . . through-part for placing integrated electrode, 67 . . . exhaust port for anode gas, 68 . . . exhaust port for cooling water, 69 . . . exhaust port for cathode gas, 70 . . . nut, 71 . . . gas supply port of anode, 72 . . . gas supply port of cathode, 73 . . . gas exhaust port of anode, 74 . . . gas exhaust port of cathode, 75 . . . cooling water supply port, 76 . . . cooling water exhaust port, 81 . . . separator, A . . . integrated electrode.

DETAILED DESCRIPTION OF THE INVENTION

A solid electrolyte membrane having a function of permitting permeation of hydrogen ions referred to above is, in general, one comprising fluorine-containing polymer of which a part of the fluorine atoms have been replaced with sulfonic acid groups, and is not particularly limited so long as it is a polymer membrane having a function of transferring hydrogen ions. For example, it is a polymer membrane comprising polymer chains comprising tetrafluoroethylene as a basic unit in which fluorine atoms contained in the polymer chain are replaced, through alkylene chains of about 2-5 carbon atoms (e.g., $—CF_2CF_2—$, $—CF_2CF_2(CF_3)—$, etc.) interposed therebetween, with sulfonic acid groups ($—SO_3H$) at terminals of said alkylene chains.

The electrode layer referred to herein is a layer comprising an electrode catalyst, carbon powder and a binder, the catalyst comprising platinum or an alloy of platinum with other kind of element, e.g., ruthenium. An oxidation reaction of hydrogen (formula 1) or a reduction reaction of oxygen (formula 2) proceeds on the electrode catalyst. Hydrogen ions formed by the oxidation of hydrogen are delivered to the solid polymer electrolyte membrane, and the delivered ions combine with oxygen at the electrode layer of the opposite side to form water.

$$H_2 \rightarrow 2H^+ + 2e^- \quad \text{(formula 1)}$$

$$H^+ + \tfrac{1}{2}O_2 + 2e \rightarrow H_2O \quad \text{(formula 2)}$$

Since these reactions are accompanied by diffusion of gas and transfer of protons, it is necessary to make the electrode layer and the solid polymer electrolyte membrane thin for suppressing the voltage drop of the fuel cell caused by their mass transfer resistances. In this invention, therefore, a membrane-electrode assembly, which comprises a solid polymer electrolyte membrane and electrode layers provided to the both faces of the membrane, is used.

In this invention, an electrode of a novel structure is used which comprises a region wherein the electrode reaction proceeds, a region where hydrogen ions permeate, a region which has a function of permitting permeation of gas and of maintaining current collecting ability and a region which seals gas. This electrode is defined as an integrated electrode. The whole surface of the electrode layer of the membrane-electrode assembly is covered with a reinforcing member which has a property of permitting permeation of gas (permeability to gases) and a property of transmitting electrons transferred in the electrode reaction (electronic conductivity) and has better mechanical strength than the membrane-electrode assembly, and the end part of the reinforcing member is covered with a sealing material having a good elasticity, whereby an integrated electrode comprising the membrane-electrode assembly and the reinforcing member can be obtained. The sealing material functions as the gas sealing member which works at the electrode reaction region in the separator face.

The sealing material usable in this invention is required to have characteristic properties as satisfactory water resistance, steam resistance, heat resistance, creep resistance, etc. It may be selected, for example, from chloroprene rubber, nitrile rubber, silicone rubber, ethylene-propylene rubber, fluororubber, isobutylene rubber, acrylonitrile rubber and acrylonitrile-butadiene rubber. In particular, ethylene-propylene rubber, acrylonitrile-butadiene rubber synthesized by copolymerizing butadiene and acrylonitrile, and acrylonitrile-butadiene rubber obtained by hydrogenating the above-mentioned rubber are excellent in water resistance, steam resistance and acid resistance and suitable as the sealing material of this invention. In this invention, however, the sealing material is not limited to these polymeric materials and may be any desired elastomers so long as they have satisfactory properties as water resistance, steam resistance, heat resistance and creep resistance.

The size of the reinforcing member should be larger than that of the electrode layer and smaller than that of the solid polymer electrolyte membrane. This is because it is necessary to prevent the short circuit of electrode layers, bonded to the both faces of the solid electrolyte membrane, with each other from occurring via the reinforcing member.

The integrated electrode of this invention can be held between two separator to constitute a single cell. By virtue of such a structure, it becomes possible to handle the integrated electrode comprising a membrane-electrode assembly and a reinforcing member as one component. Further, since gases can easily permeate the inside of the reinforcing member, it becomes possible that gases which have reached the electrode layer react in the electrode layer and further that the generated electric power transmits electrons to the separator via the reinforcing member.

As the result of the membrane-electrode assembly and the reinforcing member having been integrated, the assembly can acquire a necessary strength and, at the same time, the number of components can be decreased. In this invention, an assembly comprising the above-mentioned electrode membrane and electrode layers formed on the both faces thereof is used and, as the reinforcing member, one which has a higher mechanical strength than the membrane-electrode assembly and has a function of permitting permeation of gas is used. By attaching an elastomer, such as various rubbers, to the end part of the reinforcing member, it becomes possible to impart a gas sealing function by the elastomer, and to simplify the cell structure.

The reinforcing member can be obtained by use of carbon fiber, carbon power, or the like. The void volume present in the reinforcing member is preferably in the range of 40-90% relative to the apparent volume of the member before it is incorporated into the fuel cell. This is because by increasing the void volume, the diffusion of gas in the reinforcing member is facilitated and a good gas permeability is obtained.

When the reinforcing member is incorporated in between two separators, it is desirable that the member can be compressed to a certain extent and has a some extent of elasticity so that electrons may be transferred between the electrode layer and the separator via the said member. For example, the thickness of the reinforcing member when held between the separators is preferably in the range of 30-70% relative to the thickness at the uncompressed state before it is held between the separators. The resistance per unit area of the reinforcing member when held between the separators is required to be as low as possible; for example, when it is 1 m$\Omega$ or less per unit area, the voltage drop at the time of 1 A current application can be decreased to 1 mV or less. In such a case, since the voltage drop at the reinforcing member decreases to reduce Joule's heat generation, the deterioration of catalyst activity and membrane ionic conductivity can be prevented, and both the high output and the long life of the fuel cell can be attained simultaneously.

The separator is provided on one side or the both sides of the flat faces of a member comprising a flat sheet with grooves for passing gases (which serve as the passages for gas and water), through which grooves are supplied hydrogen, or oxygen or air, from the outside of the cell. The convex part adjacent to the passage is pressed against the electrode layer, whereby electrons can be transferred between the part and the electrode layer, and electric power can be taken out to the outside via a current collecting plate contacting with the separator. For the purpose of supplying the gas supplied from the groove of the separator to the whole electrode layer and for obtaining electricity from the whole electrode layer at a low resistance, a method can be adopted wherein a porous carbon layer is provided between the electrode layer and the separator. The passages on the both faces are preferably provided so that their plane configurations are just the opposite of each other.

Thus, the separator used in the fuel cell has a supply port and an exhaust port for supplying gas from the outside and exhausting gas which has reacted in the electrode layer. Some separators have at least one passage formed for allowing cooling water to pass through in the separator face and are provided with a supply port and an exhaust port for supplying or exhausting the cooling water from or to the outside.

This invention provides a separator for a polymer electrolyte fuel cell which separator comprises: at least one passage for gas and water formed on at least one face of a member comprising a flat plate; supply ports for the gas and water provided so as to communicate with the passage and to pass through the member; and exhaust ports for the gas and water provided so as to communicate with the passage and to pass through the member, provides a separator further comprising a sealing member provided on outer peripheries of the supply port and the exhaust port, and provides a separator further comprising a sealing member provided, being connected to the above-mentioned sealing member, on outer peripheries of the above-mentioned passage.

The separator comprises a material obtained by compression-molding a mixture comprising carbon powder, such as natural graphite, artificial graphite, expanded graphite and amorphous carbon, and phenolic resin or a material obtained by sintering the molding thus obtained at a high temperature of 300-1,200° C., and may be in any desired shapes including a rectangular or other polygonal plate and a disc plate. It is also possible to use a material obtained by injection-molding a phenolic resin into the form of plate or disk and then sintering and carbonizing the resulting moldings. The separator of this invention may also be those prepared not only from these carbonaceous materials but from a material comprising a metal, a non-metallic material, such as resin, and a composite material comprising a metal and a non-metal.

In this invention, a sealing member having elasticity is provided in the face of the separator to prevent the leakage of gas and water from the circumference of the separator, and the periphery of the supply ports for supplying gas and water from the outside, or the periphery of the exhaust ports for exhausting gas or water to the outside.

The sealing member is required to have characteristic properties including a good water resistance, steam resistance, heat resistance and creep resistance. Elastomers usable in the fuel cell of this invention may be selected from chloroprene, nitrile rubber, silicone rubber, ethylene-propylene rubber, fluororubber, isobutylene rubber, acrylonitrile rubber and acrylonitrile-butadiene rubber. In particular, ethylene-propylene rubber, acrylonitrile-butadiene rubber synthesized by copolymerizing butadiene and acrylonitrile, and acrylonitrile-butadiene rubber obtained by hydrogenating the above-mentioned rubber are excellent in water resistance, steam resistance and acid resistance and suitable as the material for the sealing member of this invention. In this invention, however, the sealing member is not limited to the polymeric materials mentioned above, but may be any desired elastomers so long as they have characteristic properties as satisfactory water resistance, steam resistance, heat resistance and creep resistance. The rubber used in this invention may be formed into a sealing member of predetermined shape by converting it into a fluid state by heating, followed by injection molding, but liquid rubber, thermoplastic rubber, and the like may also be used to prepare a sealing member at lower temperatures.

The region wherein an electrochemical reaction proceeds in the separator face and the supply port or the exhaust port of gas are connected by the passage for the gas. In this case, it is necessary, before the sealing member is processed, to cover a part of the passage with a covering component and flatten the part to which the sealing member is to be provided. In this invention, a separator covered with a covering component was used.

The covering component is a plate-formed article comprising carbon, metal, or resins such as phenolic resin and polyester. The place at which the covering component is to be applied to the separator is provided with a difference in level of about the same depth as the thickness of the component, and the component is bonded to the separator with an adhesive such as thermosetting epoxy resin.

The adhesive which can be used in this invention is preferably thermoplastic and preferably has a curing temperature of 200° C. or below. After the covering component has been bonded to the separator, the sealing member of this invention is placed on the upper part of the component. By such a simple method, it becomes easy to provide the sealing member in the separator face while securing the passage of gas.

When the sealing member-bearing separator of this invention is used, it becomes possible to make the reaction gases of the anode and the cathode respectively pass through the gas passage provided to the both faces of the separator. As the result, the number of separators can be decreased and the cell size can be reduced. This is because, in the separator of this invention, the supply port and the exhaust port of gases can be sealed each independently.

The electrode layer of the integrated electrode generates electricity by contracting with gas passing through in the separator face. This region where electricity is generated is designated as the generation region. Relative to the generation region, the sealing part borne by the integrated electrode is positioned more outside than the generation region and prevents gas from leaking out of the generation region. It is also possible to prevent the leakage of gas doubly by providing, in addition to the sealing part borne by the integrated electrode, a sealing part of the separator to the more outer side than the sealing part of the integrated electrode. It is also possible to provide a sealing part only to the peripheral parts of the supply port and the exhaust port of gas and cooling water and provide the sealing parts of the integrated electrode and the separator each independently so that the sealing part of the separator prevents only the leakage of gas and cooling water from the supply port and the exhaust port.

In another embodiment of this invention, it is possible, besides polymeric sealing materials such as ethylene-propylene rubber, to use such carbon powder as expanded graphite shaped into the form of sheet. Expanded graphite is elastic and, by controlling the press work, a high density part and a low density part can be produced in the sheet face. Thus, the low density part is compressed when pressure is applied thereto from the outside and exhibits a certain extent of restoring force, and hence the carbonaceous sheet can be used as the elastomer of this invention.

As one example of this invention, a low density carbon region is prepared in the form of a ring so as to surround the gas supply port, and the other part of the sheet is compressed to a high density, whereby the low density part is deformed by compression and resultantly the leakage of gas from the gas supply port can be prevented. The low density part of the carbonaceous sheet is preferably formed in the range of density of 1-1.2 g/cc and the high density part in the range of 1.5-1.8 g/cc. The sheet may also be prepared by making a mixed composition comprising carbon particles and a binder and then forming the mixture into a sheet.

Examples of binders which can be used in this invention include ethylene-propylene rubber, silicone rubber and fluororesins, such as poly(vinylidene fluoride) and polytetrafluoroethylene. The carbonaceous sheet thus prepared is bonded to a separator with epoxy resin to produce a separator provided with a sealing member, and thus the production process can be simplified. The epoxy resin which can be used in this invention is a thermosetting one having a curing temperature of preferably not higher than 200° C.

When the integrated electrode and the separator of this invention are used in combination, it is also possible, in the separator described above, to omit the sealing member on the peripheral part of the separator and provide a sealing member only to the peripheries of the supply ports for supplying gas and water from the outside or only to the periphery of the exhaust port for exhausting gas or water to the outside. Thus, the leakage of gas from the region where the electrode reaction proceeds in the separator face can be prevented by the sealing member of the integrated electrode.

According to this invention, since the sealing member of the gas supply port and exhaust port possessed by the separator and the sealing member possessed by the integrated electrode function each independently, even when the position at which the electrode membrane is placed in the separator face fluctuates, gas sealing can be attained satisfactorily. Thus, the restriction or positioning accuracy for the electrode membrane and the separator is relaxed and hence, according to the invention, sensors generally used for stacking the components, constituting a fuel cell, in high accuracy can be omitted, which is effective in improving the yield. Accordingly, by using a robot or conveyance equipment for transferring the integrated electrode and separator of this invention, automation of the stacking step is facilitated, and the production per unit time and the yield in production of fuel cells can be improved.

Further, according to this invention, the integrated electrode can be formed in any desired shape including a circle, ellipse and square, or a shape having a through-hole, so that it is also possible to provide a through-hole for a bolt for fixing the gas passage port, the cooling water passage port and the stack part of the fuel cell, in the face of the electrode membrane, and thus a high degree of freedom is obtained in selecting the shape. Since the sealing members of the integrated electrode and the separator of this invention function each independently, the respective sealing members can be formed in any desired shape; for example, a through-hole for a bolt can be provided in the face of the separator. When the separator is of a structure having a through-hole in its face, since pressure is directly applied to the separator face, the warpage of the separation can be prevented; resultantly, it becomes easy to tighten the whole face of the separator uniformly, and it becomes possible to stabilize the output performance and lengthen the life of the fuel cell. The end part of the through-hole may be provided with the sealing member of this invention thereby to prevent the leakage of gas.

The solid electrolyte membrane contained in the integrated electrode can be extended to the more outer side than the sealing member and formed into any desired shape. The shape exerts no influence on obtaining the effect of this invention. Thus, a hole may be bored in any desired shape at the solid electrolyte membrane portion present at the extension of the sealing member, and further a new sealing member may be formed at the surrounding of the hole.

This invention provides a sheet for a polymer electrolyte fuel cell separator which sheet comprises: respective through-holes provided to positions respectively corresponding to supply port for gas or water provided so as to communicate with at least one passage for the gas or water formed in a member comprising a flat plate and to pass through the member and corresponding to exhaust port for gas or water provided so as to communicate with the above-mentioned passage and to pass through the member; through-hole sealing parts provided to positions corresponding to outer peripheries of the above-mentioned respective through-holes; and passage-sealing parts provided, being connected with the through-hole-sealing parts, to positions corresponding to outer peripheries of the above-mentioned passage; wherein the part corresponding to the passage comprises a frame becoming the through-holes, and wherein the sealing member can be formed so as to correspond to the above-mentioned separator.

The above-mentioned frame comprises carbon or a mixture of carbon and resin, and the sealing member is press-molded so as to have a lower density than the parts other than the sealing part. This facilitates the production process.

The polymer electrolyte fuel cell of this invention may be connected with a hydrogen-producing apparatus or a hydrogen-storing apparatus via piping which passes a fuel gas containing hydrogen, to provide a clean electricity generating system. The hydrogen-producing apparatus may be, for example, a reformer which uses hydrocarbons, such as natural gas and methanol, or an apparatus which produces hydrogen by electrolysis of water using natural energy, such as sunlight and wind power. The hydrogen-storing apparatus may be, for example, a hydrogen bomb storing the hydrogen generated by the above-mentioned hydrogen-producing apparatus or a hydrogen-storing apparatus having hydrogen-absorbing alloy capable of absorbing the hydrogen at low pressures.

The generating system using the polymer electrolytic fuel cell of this invention can be used as a power source for driving various equipment including power generating equipment, such as a stationary generating facility and a portable generator, medical care equipment, such as motorized wheelchair and walking-aid equipment, and electric automobiles. Thus, the generating system can provide clean and high-performance final products.

EXAMPLES

This invention is described in detail below with reference to Examples, but the invention is not limited thereto.

Example 1

FIG. 1 is a sectional view showing one example of the integrated electrode of this invention. The solid polymer electrolyte membrane 11 comprises a polymer having sulfonic acid groups ($-SO_3H$) which serve for moving hydrogen ions into the membrane. Hydrogen ions can move in the membrane through the aid of the sulfonic acid groups. In this Example, the solid polymer electrolyte membrane 11 used is a polymer membrane comprising polymer chains comprising tetrafluoroethylene as a basic unit in which fluorine atoms contained in the polymer chain are replaced, through alkylene chains having 4 carbon atoms ($-CF_2CF_2CF_2CF_2-$) interposed therebetween, with sulfonic acid groups ($-SO_3H$) at terminals of the alkylene chains. The solid polymer electrolyte membrane 11 had a dimension of 110 mm×110 mm×20 µm thickness.

The solid polymer electrolyte 11 has electrode layers 12 and 13 bonded to the both faces thereof. The electrode layers 12 and 13 were prepared by mixing a small amount of solid polymer electrolyte into powder obtained by dispersing minute platinum particles on the surface of carbon powder, followed by thorough mixing, then coating the resulting mixture on a solid polymer membrane with a blade coater, followed by drying, and the resulting electrode layers 12 and 13 were fixed to the solid polymer membrane 11 by hot pressing. The electrode layers 12 and 13 each had a dimension of 100 mm×100 mm.

A porous carbon sheet (dimension: 105 mm×105 mm×0.3 mm thickness) comprising fibrous carbon having diameters of 0.1 µm or less was used as the reinforcing member 14. A dimethylfuran (DMF) solution containing a small amount of solid electrolyte was coated on the reinforcing member 14, which was then made to hold the membrane from the both sides, and the solvent was removed by drying. The dimension of the porous carbon sheet was made larger than that of electrode layers 12 and 13 and smaller than that of the solid polymer electrolyte membrane 11 to prevent the occurrence of short circuit between the electrode layers 12 and 13 bonded to the both sides of the solid polymer electrolyte membrane 11. Attention should be paid not to cause short circuit between the electrode layers even at the same length. It is also allowable to use a shorter solid polymer electrolyte membrane 11 and interpose liquid rubber in the space.

Thereafter, the reinforcing member 14 and the solid polymer electrolyte membrane 11 were bonded to each other by hot pressing. The whole periphery of the end of the reinforcing member is provided with a sealing member 15 sealed with liquid rubber of ethylene-propylene rubber. The liquid rubber was a solution prepared by dissolving ethylene-propylene rubber in xylene. Though xylene was used as the solvent in this Example, other organic solvents may be selected according to the kind of solid polymer membrane. The ethylene-propylene rubber solution was coated while the end of the reinforcing member 14 was being pressed against the membrane, and the solvent was removed by drying under a vacuum at about 80° C. to harden the ethylene-propylene rubber. The sealing member 15 is of a form having a protuberance rising from the face of the reinforcing member 14 and, by being pressed against the face of a separator described later, functions as the gas sealing member 15. The electrode shown in FIG. 1 is designated as the integrated electrode A.

Example 2

Figure 2A:
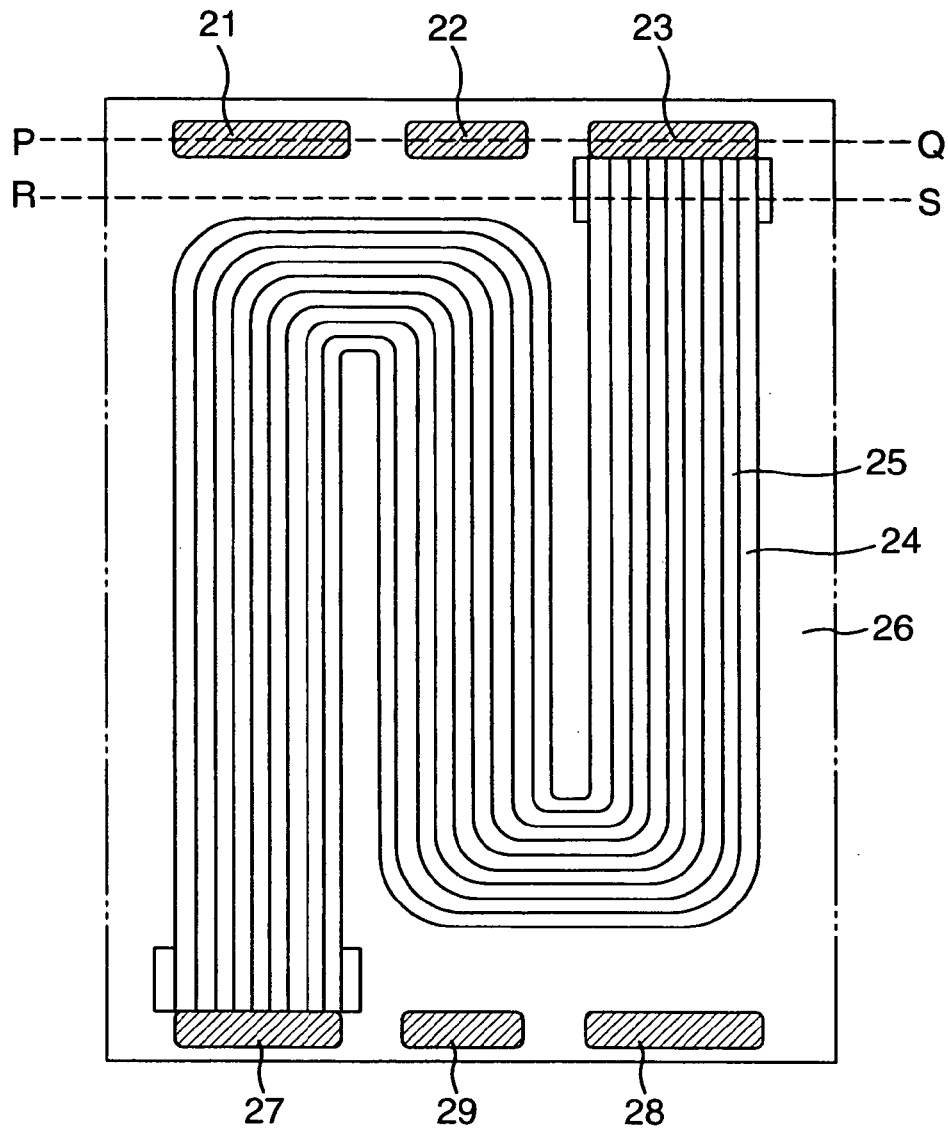
FIG. 2 is a drawing showing an anode face of a separator for a polymer electrolyte fuel cell of this invention.
Figure 2B:
Figure 2C:
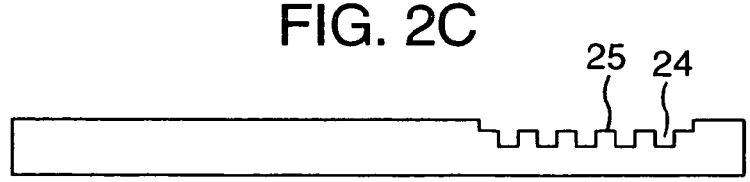

FIG. 2 is a diagram showing the structure of one example of the separator for an electrode of this invention, (a) being the anode face front view, (b) being the P-Q sectional view and (c) being the R-S sectional view. A graphite sheet was used for the separator, in the face of which was grooved a gas passage 24 having a groove depth of 0.5 mm and a thickness of 2 mm at the flat part 26 of the separator, and the gas is introduced into the passage in the separator face from supply port 23 comprising a through-hole. As is apparent from the R-S sectional view (c) of FIG. 2, five inverse S-type passages 24 and four ribs 25 are arranged alternately. These passages, meandering from the gas supply port 23, are connected to the gas exhaust port 27. Numeral 25 indicates a convex part which has not been grooved, which is referred to as a rib. The position of the flat part of the convex part 25 is, as shown in the R-S section (c), made lower than the peripheral part 26 of the separator by the thickness of the covering component described later. This is for placing the covering component in Example 3 described later. Further, as shown in the R-S section, the part with difference in level was made to be wider than the width of the five passages 24 to permit coating of the adhesive for the covering component. Grooves in the section other than the R-S section were formed on the same plane as the flat sheet face having no level difference.

In this Example, two kinds of separators were prepared: one wherein passage grooves were formed also on the back face in a form observed when the right and left of the passage grooves of the same shape as shown in FIG. 2 was reversed, and one which was not grooved on the back face. Though the latter has no passage groove, it is provided with the gas supply port 23 and the exhaust port 27. The former is designated as the electrode separator B and the latter as the electrode separator C. In the case of the separator B, the supply of gas to the back face is conducted by introducing the gas from the supply port 21, the gas flows through the passage formed on the back face, and is exhausted to the exhaust port 28. Numerals 22 and 29 respectively indicate the supply port and the exhaust port for cooling water, which are each a through-hole. The passage for cooling water is as shown in Example 5.

Figure 3A:
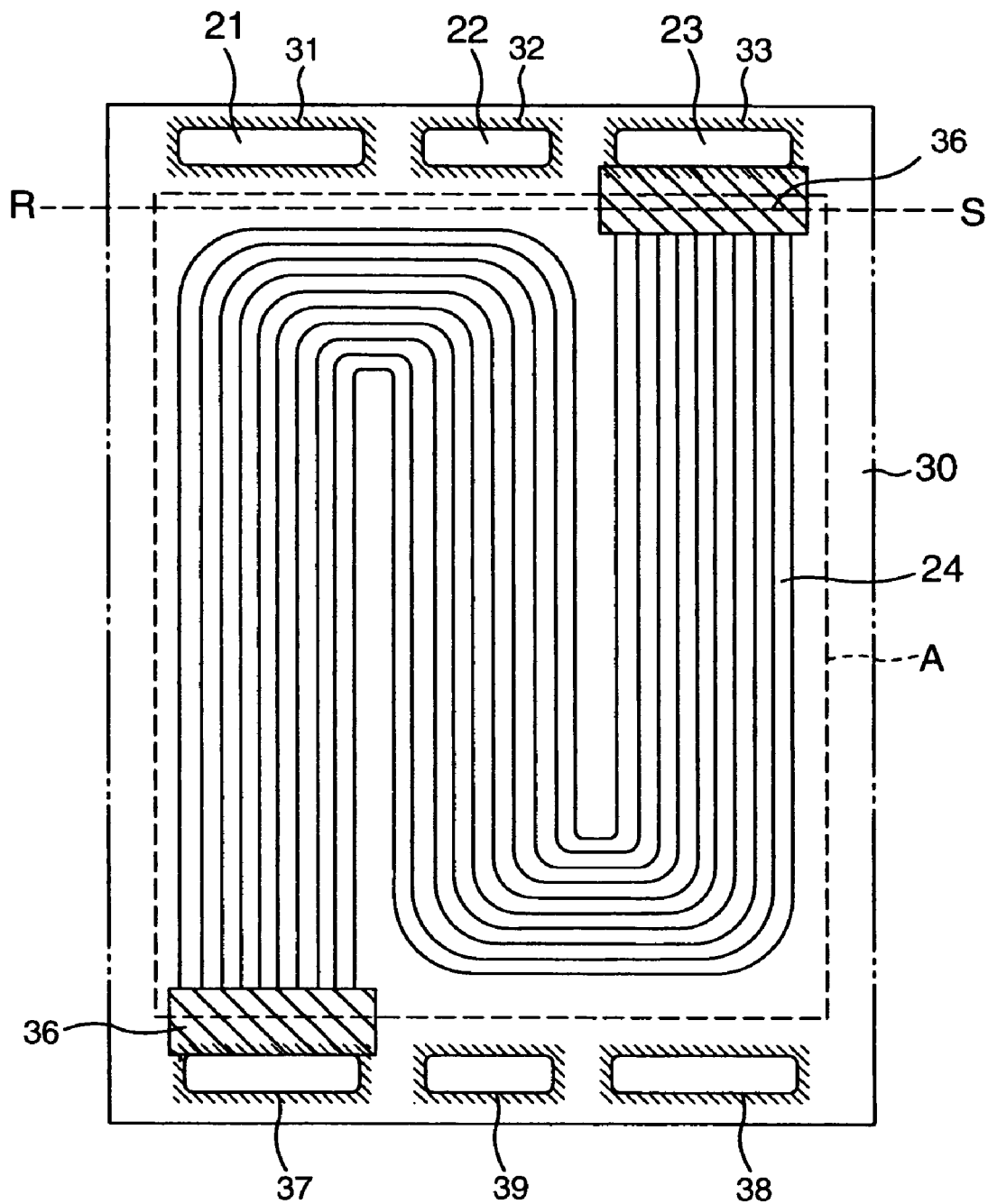
FIG. 3 is a drawing showing an anode face of a separator for a polymer electrolyte fuel cell of this invention mounting a single cell.
Figure 3B:
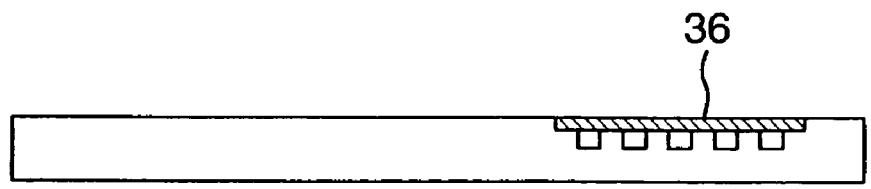

FIG. 3 is a plan view showing the integrated electrode A obtained in Example 1 united to the separator of FIG. 5 described later. The separator of this Example also has the same plane structure. The integrated electrode A is arranged on the inside of the respective supply ports and exhaust ports of gas and cooling water.

Example 3

Figure 4A:
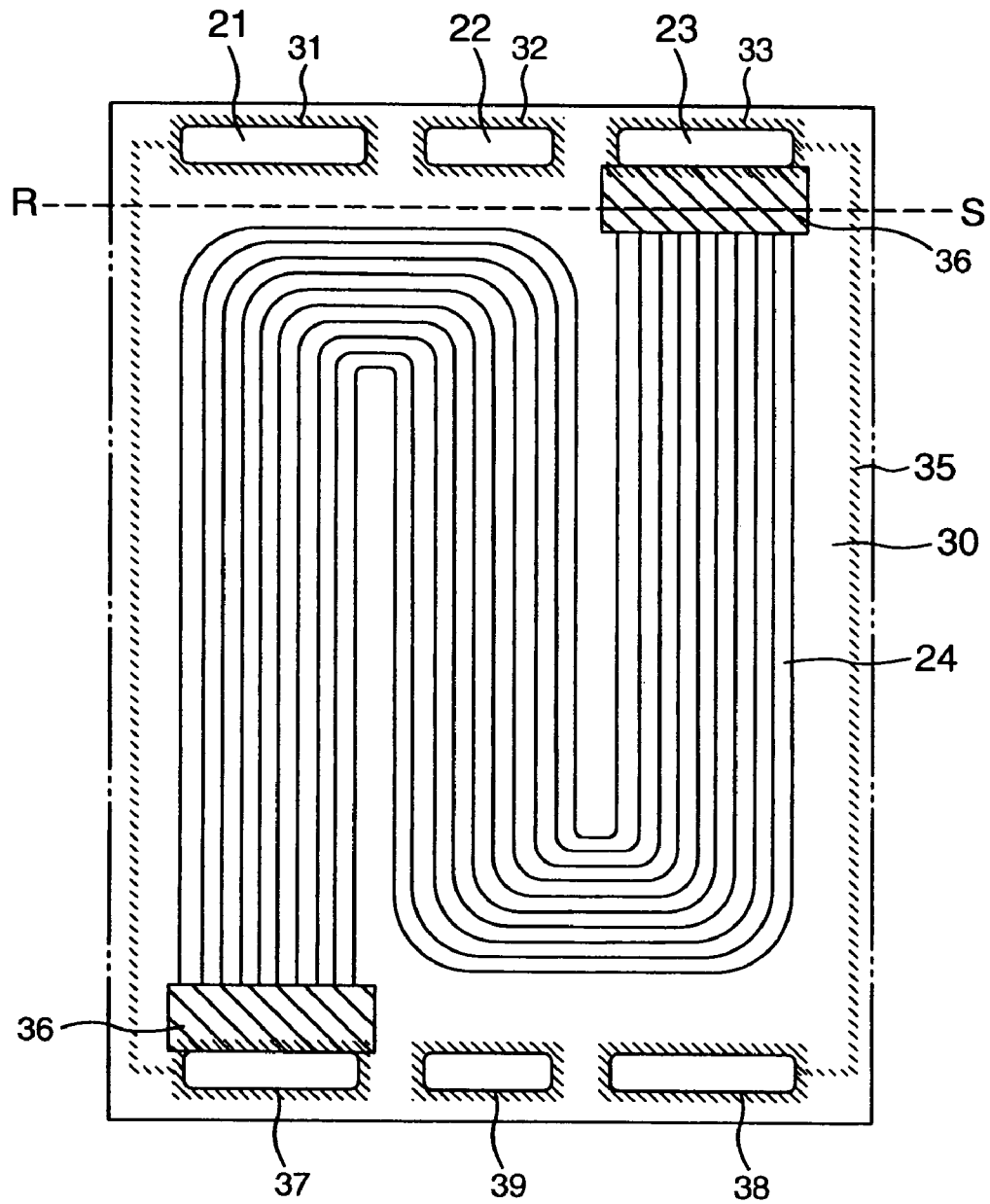
FIG. 4 is a drawing showing an anode face of a separator for a polymer electrolyte fuel cell of this invention to which a sealing member is applied.
Figure 4B:

FIG. 4 is a structural diagram showing one example of this invention wherein a sealing member comprising a protuberance of elastomer is provided to the separator for a single cell shown in FIG. 2. In the Figure, (a) is the plan view of the anode face and (b) is the R-S sectional view. The separator of this Example is the same as in Example 2 except that the former has a covering member 36, sealing members 31, 32, 33 and 35 respectively provided to the supply port for anode gas, supply port for cooling water and supply port for cathode gas, and sealing members 37, 38 and 39 respectively provided to the exhaust post for anode gas, exhaust port for cooling water and exhaust port for cathode gas. First, a part of the gas passage shown in FIG. 2 is covered with the covering member 36. The face of the separator to which the covering member 36 is to be provided is, as shown in the R-S sectional view (b), preliminarily provided with a difference in level for providing the covering member 36 so that the member 36 may ultimately form the same plane as the separator flat face. As the result of the same plane being formed as described above, the sealing member 33 is formed flatwise. The covering member 36 used in this Example is a graphite sheet 0.2 mm in thickness. A minute amount of thermosetting epoxy resin was coated on the covering member 36 such that blockage of the groove of the gas passage 24 might be avoided, and the covering member 36 was bonded to the position shown in FIG. 4.

In this way, the gas passage from the gas supply port to the electrode reaction part could be covered. Thus, after the separator has been formed, a flat part could be formed in the separator face by the simple and easy method of this invention without the necessity of boring, in the separator section, a tunnel-formed hole for passing gas from the gas supply port to the electrode reaction part. Further, by coating an adhesive on the different-level part shown in the R-S sectional view, processing could be achieved wherein the problem of blockage of the groove below the covering component hardly occurred and hence the yield was high.

Then, a die for injection molding was pressed against the separator for electrode and, while the die was being heated, a sealing resin was poured into the die as the sealing member. The sealing resins used in this Example was 6 kinds of silicone rubber, ethylene-propylene rubber, fluororubber, isobutylene rubber, acrylonitrile rubber and acrylonitrilebutadiene rubber. Each of the sealing resins was separately poured into the die, and sealing members 31, 32, 33 and 35 were bonded to the separator surface such that the height relative to the plane part 30 of the separator might be 0.8 mm. In this manner, with a one stage process, a sealing member comprising the sealing member 35 of the linear part and the sealing members 31, 32 and 33 of the square part connected with each other could be formed on the electrode separator. The back side had no sealing member attached thereto so that, when the separators were stacked as shown in FIG. 4, the sealing member might be pressure-bonded to the plane part (26 of FIG. 2) of the opposing separator. Thus, with regard to the separator B of Example 2, the sealing member was attached only to the surface and, with regard to the separator C, the sealing member was attached only to the grooved surface.

Example 4

The reinforcing member used in Example 3 was changed to a phenolic resin sheet 0.2 mm in thickness. A minute amount of thermosetting epoxy resin was coated con the covering component such that the groove of the gas passage 24 might not be blocked, and the covering component was bonded to the position shown in FIG. 4. Then, the injection molding die was changed such that a sealing member be not formed at the gas linear part 35 unlike in Example 3 and that only sealing members be formed which sealing members are sealing members 31, 32 and 33 provided respectively to the anode gas supply port, cooling water supply port and cathode gas supply port and sealing members 37, 38 and 39 provided respectively to the anode gas exhaust port, cooling gas exhaust port and cathode gas exhaust port, and according to the same procedure as in Example 3, a separator was prepared which had sealing members wherein sealing members 31, 32 and 33 provided respectively to the anode gas supply port, cooling water supply port and cathode gas supply port and sealing members 37, 38 and 39 provided respectively to the anode gas exhaust port, cooling gas exhaust port and cathode gas exhaust port have not been connected with each other.

Figure 5A:
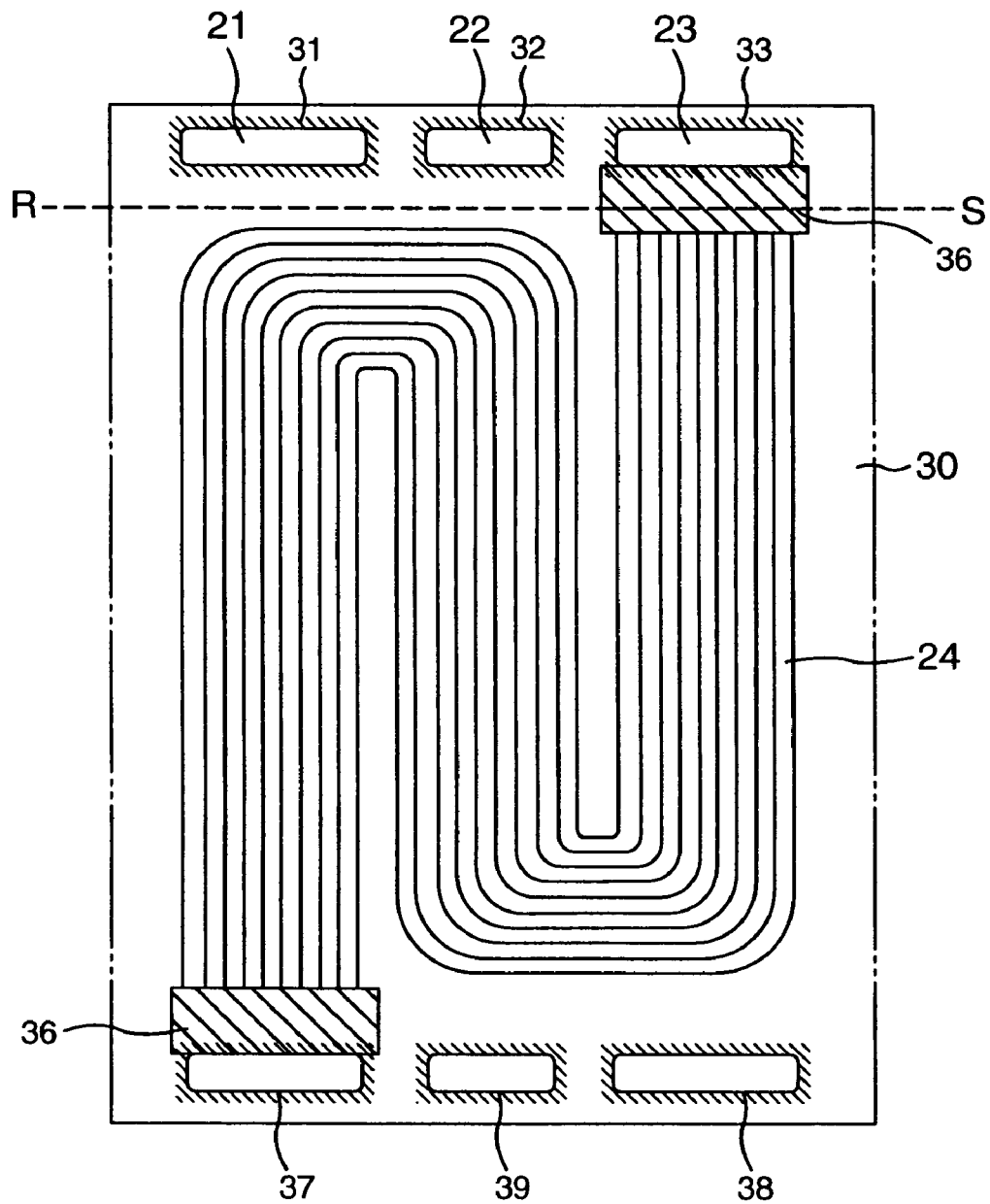
FIG. 5 is another drawing showing an anode face of a separator for a polymer electrolyte fuel cell of this invention to which a sealing member is applied.
Figure 5B:
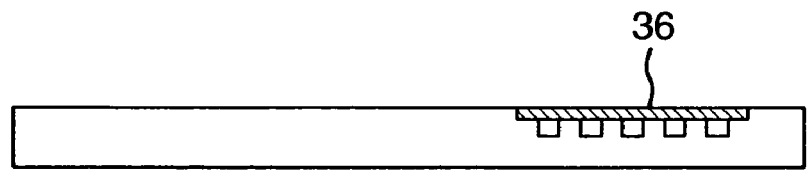

The separator of this Example is shown in FIG. 5. The resins for the sealing member used were the same as in Example 3. Thus, in all the cases wherein any of the sealing resins was used, in one stage step, an electrode separator could be formed which had sealing members at 6 places, that is, sealing members 31, 32 and 33 provided respectively to the anode gas supply port, cooling water supply port and cathode gas supply port, and sealing members 37, 38 and 39 provided respectively to the anode gas exhaust port, cooling water exhaust port and cathode gas exhaust port. The back face had no sealing member attached thereto so that, when the separator shown in FIG. 4 were stacked, the sealing member might be pressure-bonded to the plane part (26 of FIG. 2) of the opposing separator. Thus, with regard to the separatorBof Example 2, the sealing member was attached only to the surface and, with regard to the separator C, the sealing member was attached only to the grooved surface. Also in the present Example, the integrated electrode A is arranged in the same manner as described above.

Example 5

Figure 6A:
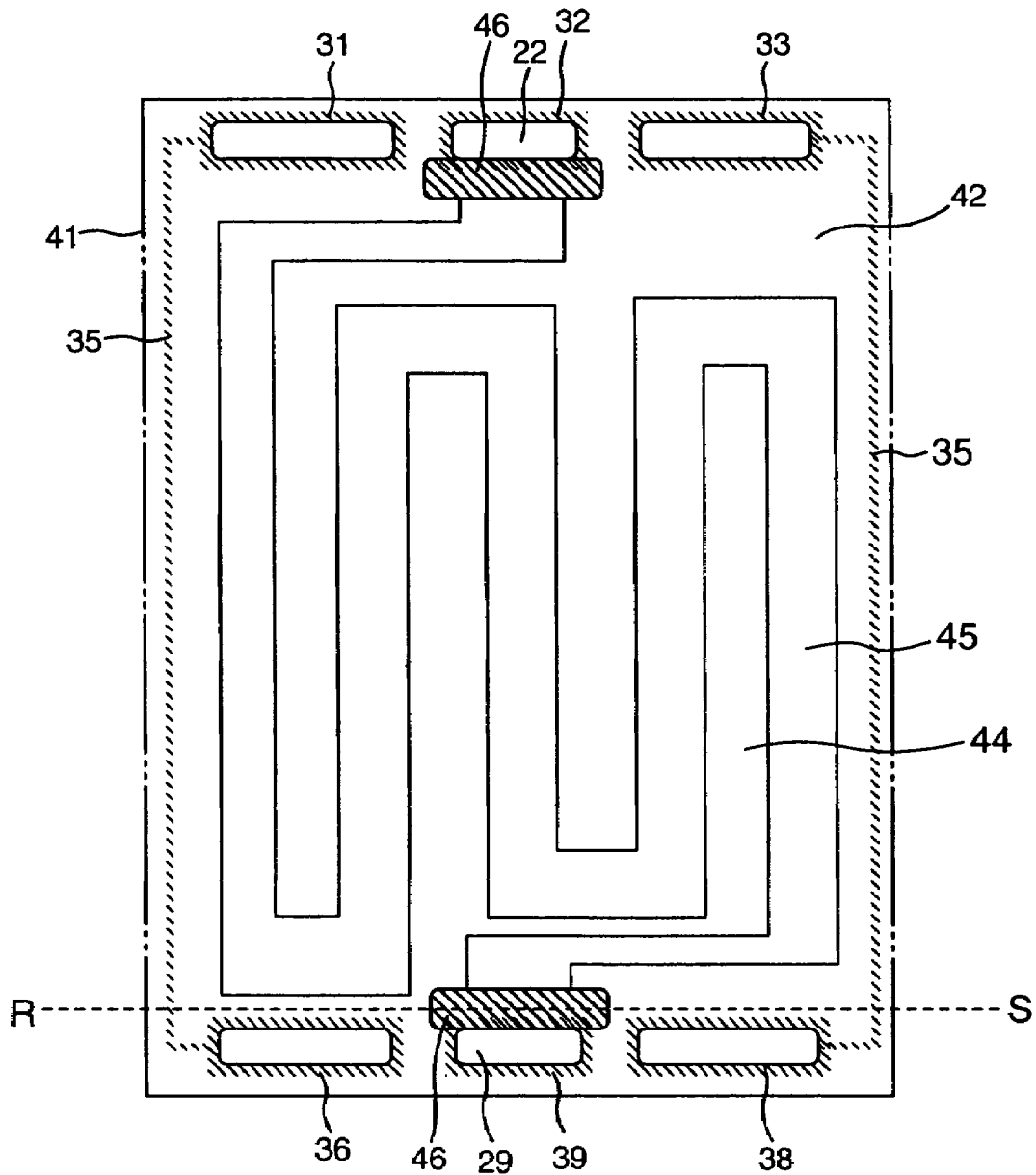
FIG. 6 is a drawing showing a sealing member for a polymer electrolyte fuel cell according to this invention.
Figure 6B:
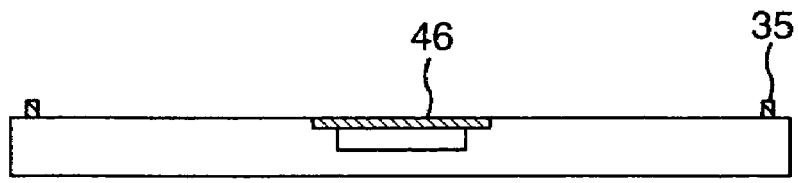

FIG. 6 shows the structure of a separator 41 for cooling water, (a) being the plan view and (b) being the R-S sectional view. As shown in the Figure, the passage 45 is formed as a flat groove having no difference in level except at the part provided with the reinforcing member 46. Cooling water is introduced from the supply port 22, then passed through the passage 45 formed in the face of the separator, and exhausted from the discharge port 29. Numeral 42 indicates a flat part, which is in the same plane as the flat part of the convex part 44 surrounding the passage 45. The back face of the separator for cooling water has been grooved in the same manner as in the separator for electrode shown in FIG. 2. The flat part 42 of the separator had a thickness of 2 mm and a groove depth of 0.5 mm. Further, as shown in the R-S sectional view, difference in level was provided to a part of the groove to place the covering component 46 for covering the cooling water passage, and the different-level part and the covering component 46 were bonded to each other with thermosetting epoxy resin.

In the same manner as in Example 3, an injection molding die was pressed against the separator for cooling water, and 6 kinds of sealing resins shown in Example 3 were respectively poured thereinto to form a sealing member wherein the sealing member 35 of the linear part, sealing members 31, 32 and 33 provided respectively to the supply port for anode gas, supply port for cooling gas and supply port of cathode gas and sealing members 37, 38 and 39 provided respectively to the exhaust port for anode gas, exhaust port for cooling gas and exhaust port for cathode gas were connected to each other. This separator for cooling water is designated as the separator D.

Example 6

Figure 7:
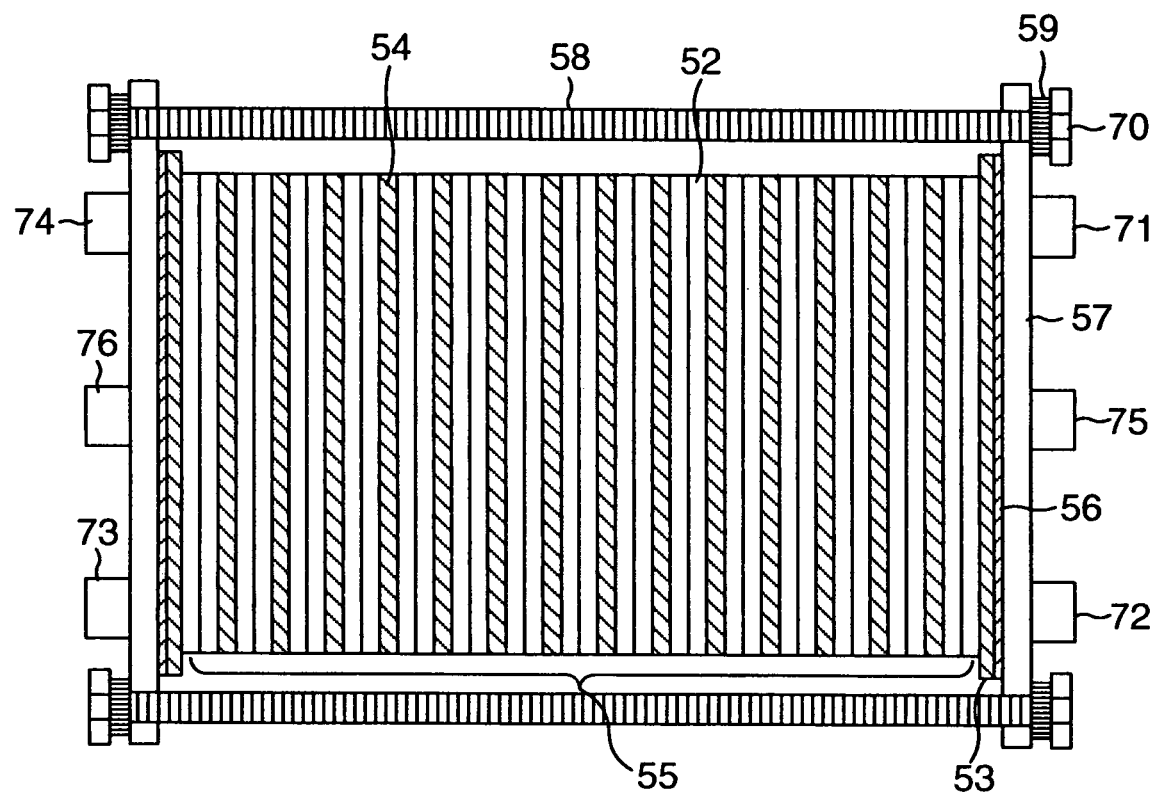
FIG. 7 is a sectional view of a fuel cell stack obtained by stacking 30 single cells of this invention.

FIG. 7 is a sectional view of the polymer electrolyte fuel cell of this invention. On the separator B or C provided with a sealing member comprising ethylene-propylene rubber obtained in Example 3, the integrated electrode A prepared in Example 1 was arranged with the separator B or C arranged on both sides thereof, and the resulting assembly was refereed to as a single cell 52. The single cell was assembled such that the separator was arranged on one side of each of the single cell. To the separator C was opposed the separator D prepared in Example 5 so that cooling water might contact one side face of each single cell and could control the temperature of the single cell. Two separators are shown in the Figure and, though not shown in the Figure, the integrated electrode A is arranged at the center of the two separators. On the both sides of the single cell are arranged cooling water cells 54 at the part shown in Example 5 where cooling water flows. The arrangement of the integrated electrode A and the separator is the same as described before.

A stacked body 55 was prepared by stacking 30 such single cells. On the both sides of the stacked body 55 were placed current collecting plates 53 made of stainless steel 5 mm in thickness and further, on the outside of the current collecting plate was interposed a rubber sheet 56 having a thickness of 0.5 mm to secure electric insulation. The resulting assembly was tightened from the outside by using stainless steel end plates 57 having a thickness of 10 mm and upper and lower, respectively two, bolts 58 to prepare a cell stack. The bolt 58 had a diameter of 10 mm. Bolts having a diameter of 10 mm were passed through the end plate 57 at its four corners, and the two end plates were tightened, with disc springs interposed in between, with nuts 70. In attaching the bolts, a pressure of 5-10 kgf/cm$^2$ was applied to the stacked body in the stacking direction by using a hydraulic press, then the stacked body was allowed to stand as it was for 24 hours to remove superfluous gaps from the cell stack, and then the nuts 70 were tightened.

The one side end plate 57 is provided with each one of the anode gas supply port 71 and the cathode gas supply port 72, and the other side end plate is provided with the exhaust ports 73 and 64 for respective gases. For cooling water, a supply port 75 and an exhaust port 76 are attached to the respective end plates. These supply ports are formed such that they respectively supply gas and cooling water, via the passages which respectively pass through the current collecting plate 53 and the stacked body 55, to the respective single cells and cooling cells.

In this Example, the effective electrode area capable of generating electricity was selected at 100 cm$^2$. The conditions of generation in this Example is as follows. The effective electrode area capable of generation was 100 cm$^2$. The temperature of cooling water was 70° C. and the cell temperature was controlled at 70±2° C. In the electricity generation of the cell of this invention, the utilization factor of hydrogen at the anode and the utilization factor of oxygen at the cathode were respectively set at 70% and 40% relative to the generated current. The output of the cell stack of this Example was 1.5 KW at a current of 100 A and 1.5 KW at 50 A. The cell stack prepared above is designated as the cell stack E.

Then, cell stacks comprising 30 cells were prepared according to the same procedures and using the same components as in Example 6 but by using the separators B and C of Example 5 provided with a sealing member comprising ethylene-propylene rubber and the separator D of Example 6 having a sealing member comprising ethylene-propylene rubber. The temperature of cooling water was controlled at 70° C. The output of the cell stack of this Example was 1.5 KW at a current of 100 A and 1 KW at 50 A. Accordingly, it has become apparent that the same output can be obtained even when the shape of the sealing member of the separators B and C of Example 3 is changed as in Example 5.

Example 7

Figures 8A, 8B, 8C:
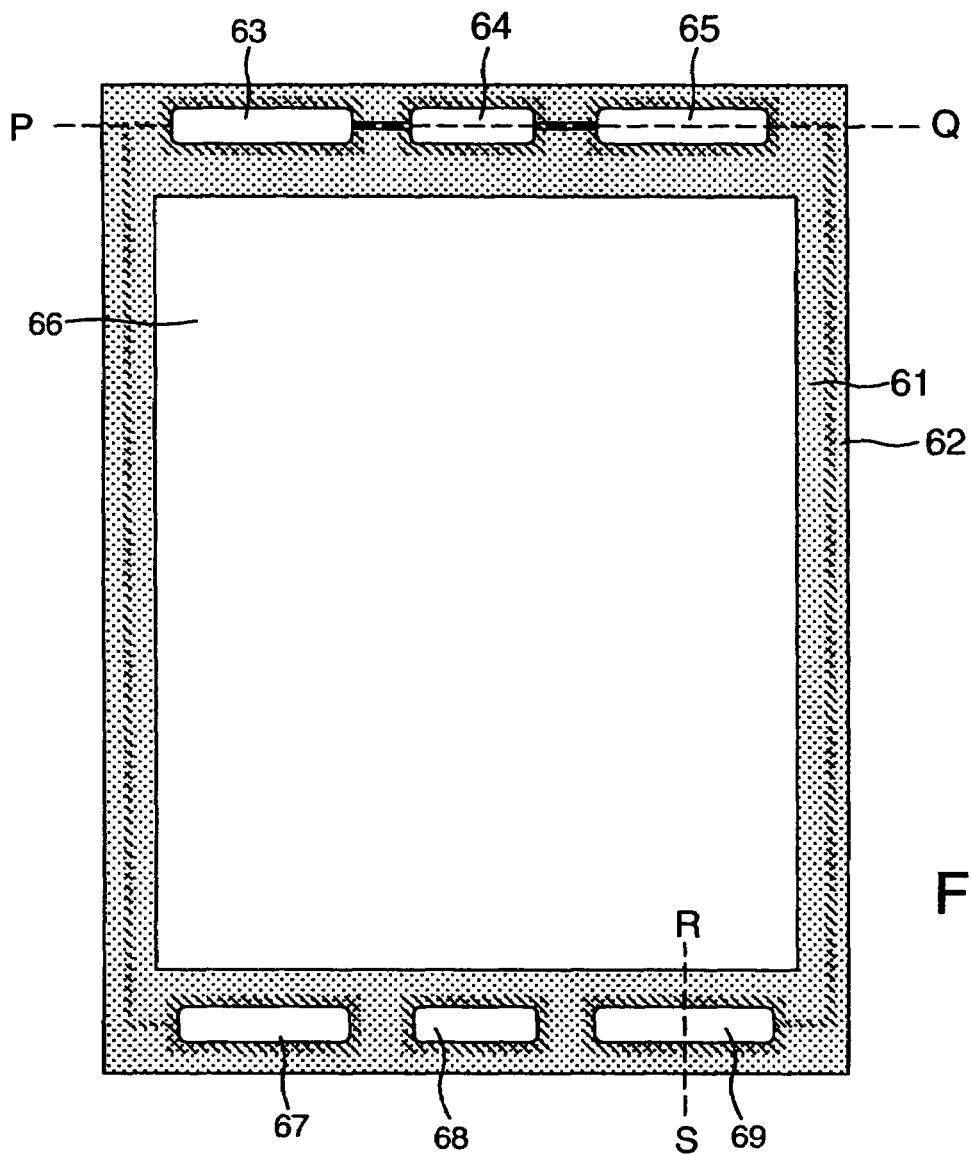
FIG. 8 is a drawing showing a carbon-containing sheet for a polymer electrolyte fuel cell of this invention which has a protuberance of low density part in a high density part of a flat framework.

FIG. 8 is a plan view showing the graphite sheet of this invention. A sheet of 0.5 mm in thickness was prepared by mixing ethylene-propylene rubber into graphite powder, filling the mixture into a die, followed by pressing. The die has been provided with grooving of low pressure part so that at the part shown by 61 the pressure applied at the time of pressing may be decreased and resultantly a protuberance may be formed, whereas at the part shown 62 a higher pressure may be applied and resultantly a flat part may be formed. The preparation of the sheet was controlled so as to obtain an average density at the part of 61 of 1.0-1.2 g/cc and an average density at the part of 62 of 1.6-1.8 g/cc. Thereafter, the part of 66 was bored with a punching die as a space for providing the anode gas supply port 65, anode gas exhaust port 67, cathode gas supply port 63, cathode gas exhaust port 69, cooling water supply port 64, cooling water exhaust port 68 and the integrated electrode the product thus obtained is designated as the sealing member F1.

Separately, expanded graphite powder was, as it was, press-molded to obtain an expanded graphite sheet of the same dimension as that of the graphite sheet mentioned above. The sheet was prepared such that it might have an average density of 1.8 g/cc, the sealing member 61 might have a density of 1.0 g/cc and form a protuberance, and other parts might be flat. The sheet comprising expanded graphite is designated as the sealing member F2.

Figure 9A:
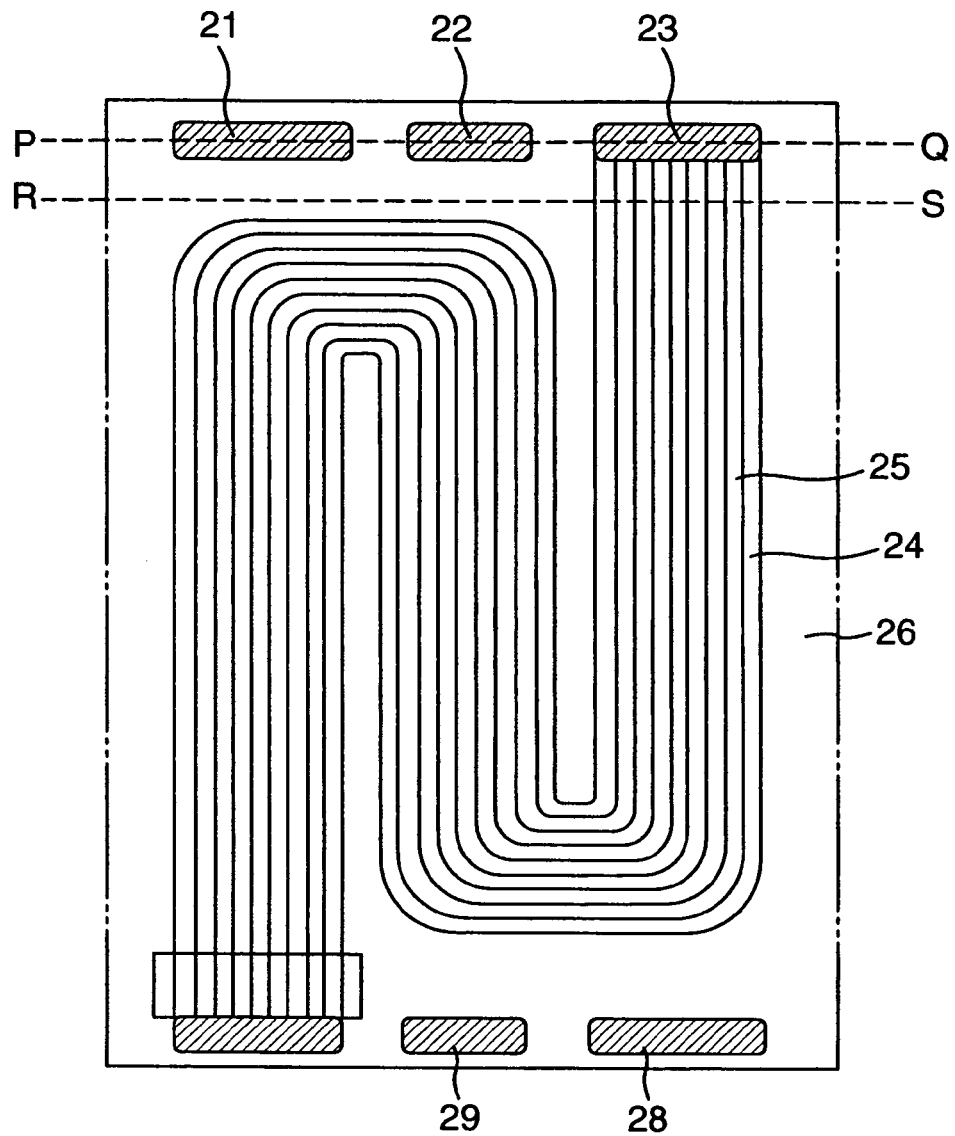
FIG. 9 is a drawing showing an anode face of a separator of a polymer electrolyte fuel cell comprising a carbon-containing sheet and a separator according to this invention.
Figure 9B:
Figure 9C:
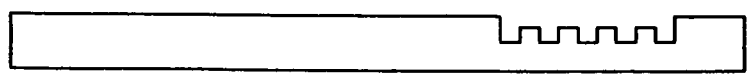
Figure 10:
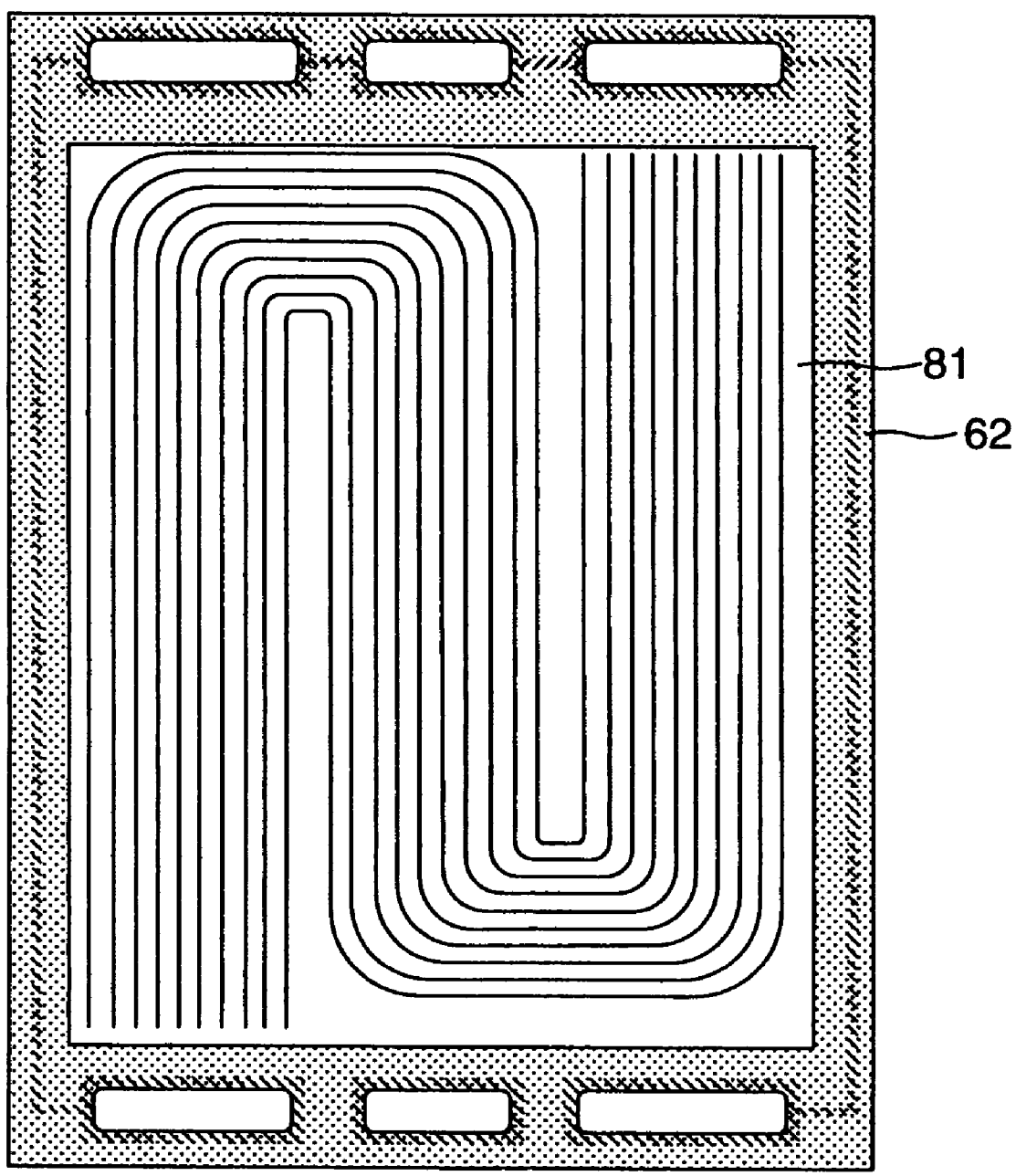
FIG. 10 is a drawing showing an anode face of a separator for a polymer electrolyte fuel cell of this invention to which a carbon-containing sheet has been laminated.

In this Example, the separator before the sealing member is bonded thereto is shown in FIG. 9, and the separator after bonding is shown in FIG. 10. The separator before bonding has been formed such that the flat part of the rib part in the R-S section has the same height as the flat part 26 of the separator. By using epoxy resin as the thermosetting adhesive, the sealing member F1 was bonded only to the surface of the separator of which the both faces had been grooved, to prepare a separator provided with a sealing member shown in FIG. 10. Numeral 81 indicates a separator which constitutes the substrate and numeral 62 indicates the sealing member shown in FIG. 8. With a separator having been grooved on the surface above, also, the sealing member F1 was bonded only to the surface. These separators are respectively designated as the separator G1 and the separator H1.

In the same manner, by using the sealing member F2 and according to the same process, a separator G2 and a separator H2 were prepared.

Then, also to the separator for cooling water shown in FIG. 4 was bonded the sealing member F of this Example. This is designated as the separator J.

In preparing a fuel cell by combining a separator with the integrated electrode of Example 1, it is also possible to use only the square-type sealing member shown in FIG. 8 and omit the linear sealing member shown by 61. This is because since the integrated electrode of Example 1 already has a sealing member, gas leakage in the electrode reaction region (the separator part opposing to 66 of FIG. 7) can be prevented.

Example 8

A cell stack comprising 30 stacked single cells was prepared with the same structure as in Example 6 by using the separators G1, H1 and J prepared in Example 7 and the integrated electrode A of Example 1. The effective electrode area capable of generating electricity was selected at 100 cm$^2$ as in Example 5. An output of 1.5 KW at 100 A and 1 KW at 50 A were obtained. The cell stack prepared above is designated as the cell stack K1.

A cell stack comprising 30 stacked single cells was prepared with the same structure as in Example 5 by using the separators G2, H2 and J prepared in Example 7 and the integrated electrode A of Example 1. The effective electrode area capable of generating electricity was selected at 100 cm$^2$ as in Example 5. An output of 1.5 KW at 100 A and 1 KW at 50 A were obtained. The cell stack prepared above is designated as the cell stack K2.

The cell stack of this Example can provide a generating system which can be used for domestic power supply wherein natural gas is used as the fuel, taken out as hydrogen through a reformer connected thereto, and the hydrogen is used as the fuel and in which hot water at 60-70° C. produced from the cell stack can be used for domestic hot-water supply.

Example 9

Figure 11:
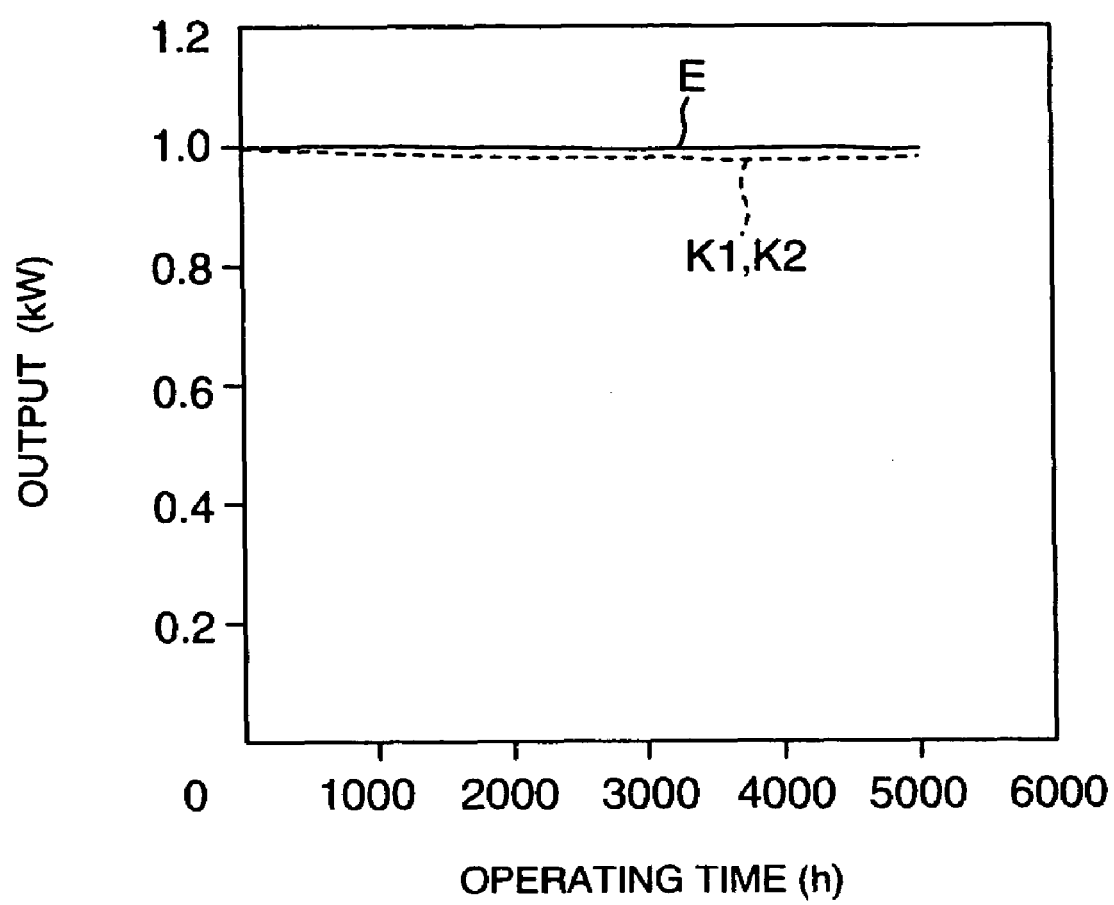
FIG. 11 is a graph showing an output life test result of a cell stack obtained by stacking 30 single cells of this invention.

FIG. 11 shows the results of continuous power generating tests at 50 A generation conducted with cell stacks E, K1 and K2 prepared in Examples 6 and 8. The cooling water temperature was set at 70° C. In the Figure, the data of K1 and K2 show exactly the same behavior, so that the data overlap each other. In every cases of the cell stacks, the output of the cell stack maintained 9.9 KW even after 5000 hrs of continuous generation, thus showing a good life characteristics. Also in this invention, a similar generating system to that described above can be obtained.

It should be further understood by those skilled in the art that the foregoing description has been made on embodiments of the invention and that various changes and modifications may be made in the invention without departing from the spirit of the invention and the scope of the appended claims.

EFFECTS OF THE INVENTION

The integrated electrode for a polymer fuel cell of this invention comprising a solid polymer electrolyte membrane, electrode layer, reinforcing member and sealing member makes it possible to handle it as one component, hence to transport easily and place accuracy the component at the time of cell assembly and further, due to reduction of the number of components, to provide a cell stack having good current-voltage characteristic and life characteristic. Moreover, since the integrated electrode and separator have been provided respectively with a sealing member, the conditions for positioning accuracy of the integrated electrode and separator are relaxed, hence the automation of the assembling step can be attained, and resultantly the yield and the productivity of the product can be improved.

What is claimed is:

1. A polymer electrolyte fuel cell comprising:
a plurality of single cells, each single cell including:
   a sealing member;
   a solid polymer electrolyte membrane;
   electrode layers formed respectively on both faces of the solid polymer electrolyte membrane;
   reinforcing members which cover respective outer surfaces of the electrode layers; and
   separators with anode gas and/or cathode gas channels, wherein:
the sealing member covers end parts of the reinforcing members, and
the electrolyte membrane and the reinforcing members are combined by the sealing member and held between the separators.

2. A polymer electrolyte fuel cell comprising:
a plurality of single cells, each single cell including:
   a sealing member;
   a solid polymer electrolyte membrane;
   electrode layers formed respectively on both faces of the solid polymer electrolyte membrane;
   reinforcing members which cover respective outer surfaces of the electrode layers; and
   separators with anode gas and/or cathode gas channels, wherein:

the sealing member covers end parts of the reinforcing members, the electrolyte membrane and the reinforcing members are combined by the sealing member and held between the separators, the electrode layers have a polymer electrolyte and catalyst particles formed on a surface of carbon particles, and the reinforcing members comprise a sheet having a permeability to gases and electronic conductivity.

3. The polymer electrolyte fuel cell according to claim 2, wherein the sheet comprises a porous carbon sheet, felt or film paper.

4. The polymer electrolyte fuel cell according to claim 3, wherein the sealing member comprises at least one material selected from the group consisting of chloroprene rubber, nitrile rubber, silicone rubber, ethylene-propylene rubber, fluororubber, isobutylene rubber, acrylonitrile rubber, and acrylonitrile-butadiene rubber.

5. The polymer electrolyte fuel cell according to claim 1, wherein each single cell contained in the polymer electrolyte fuel cell is held between two of the separators.

6. The polymer electrolyte fuel cell according to claim 2, wherein each single cell contained in the polymer electrolyte fuel cell is held between two of the separators.

7. The polymer electrolyte fuel cell according to any one of claims 1-4, further comprising:

cooling separators with coolant channels.

8. The polymer electrolyte fuel cell according to claim 1, wherein other end parts of the reinforcing members are covered by another sealing member.

9. The polymer electrolyte fuel cell according to claim 2, wherein other end parts of the reinforcing members are covered by another sealing member.

* * * * *